United States Patent
Orr

(10) Patent No.: US 11,061,108 B1
(45) Date of Patent: Jul. 13, 2021

(54) SLIDING WINDOW DISCRETE FOURIER TRANSFORM (SWDFT) POLICE SIGNAL WARNING RECEIVER

(71) Applicant: Escort Inc., Chicago, IL (US)

(72) Inventor: Steven K. Orr, Cincinnati, OH (US)

(73) Assignee: Escort Inc., Chicago, IL (US)

( * ) Notice: Subject to any disclaimer, the term of this patent is extended or adjusted under 35 U.S.C. 154(b) by 270 days.

(21) Appl. No.: 16/224,439

(22) Filed: Dec. 18, 2018

Related U.S. Application Data

(60) Provisional application No. 62/607,284, filed on Dec. 18, 2017.

(51) Int. Cl.
*G01S 7/40* (2006.01)
*G01S 7/02* (2006.01)
(Continued)

(52) U.S. Cl.
CPC ............. *G01S 7/022* (2013.01); *G01S 7/04* (2013.01); *G01S 7/4806* (2013.01); *G01S 7/486* (2013.01); *G01S 7/51* (2013.01); *G01S 13/91* (2013.01)

(58) Field of Classification Search
CPC ...................................................... G01S 7/022
See application file for complete search history.

(56) References Cited

U.S. PATENT DOCUMENTS

| | | |
|---|---|---|
| 3,754,253 A | 8/1973 | Balsiger |
| 3,956,626 A | 5/1976 | Ross |

(Continued)

FOREIGN PATENT DOCUMENTS

| | | |
|---|---|---|
| CN | 101889215 A | 11/2010 |
| CN | 201718054 U | 1/2011 |

(Continued)

OTHER PUBLICATIONS

Springer, Tom, "Sliding FFT computes frequency spectra in real time", EDN Magazine article, Sep. 29, 1988, pp. 161-166, 168 and 170.

(Continued)

*Primary Examiner* — Timothy A Brainard
(74) *Attorney, Agent, or Firm* — K&L Gates

(57) ABSTRACT

In one embodiment, a police activity detector is provided. The detector includes a receiver section and a warning section. The receiver section is configured to receive signals generated in the context of law enforcement activity. The warning section is configured to respond to a pulsed signal received by the receiver section and provide an alert if a received signal correlates to a law enforcement signal. The warning section also includes a sliding window discrete Fourier transform (SWDFT) module configured to receive a plurality of time series of data corresponding to sampling a received pulsed signal at a set of sample rates corresponding to a plurality of target frequencies, perform a SWDFT determination on each of the plurality of time series of data to determine a magnitude of the received signal at each of the targeted frequencies, which reveals the presence of a received pulsed signal when the magnitude is elevated, and issue an alert if the magnitude of the received signal corresponding to at least one of the targeted frequencies is greater than or equal to a predetermined threshold.

16 Claims, 4 Drawing Sheets

(51) Int. Cl.
*G01S 7/48* (2006.01)
*G01S 13/91* (2006.01)
*G01S 7/51* (2006.01)
*G01S 7/486* (2020.01)
*G01S 7/04* (2006.01)

(56) References Cited

U.S. PATENT DOCUMENTS

| | | | |
|---|---|---|---|
| 4,360,811 A | 11/1982 | Cantwell, Jr. et al. | |
| 5,021,961 A | 6/1991 | Ross et al. | |
| 5,049,885 A | 9/1991 | Orr | |
| 5,079,553 A | 1/1992 | Orr | |
| 5,134,406 A | 7/1992 | Orr | |
| 5,151,701 A | 9/1992 | Valentine et al. | |
| 5,206,651 A | 4/1993 | Valentine et al. | |
| 5,218,467 A | 6/1993 | Ross et al. | |
| 5,229,947 A | 7/1993 | Ross et al. | |
| 5,250,951 A | 10/1993 | Valentine et al. | |
| 5,280,288 A | 1/1994 | Sherry et al. | |
| 5,300,932 A | 4/1994 | Valentine et al. | |
| 5,305,007 A * | 4/1994 | Orr | G01S 7/022 342/20 |
| 5,510,793 A | 4/1996 | Gregg, III et al. | |
| 5,515,402 A | 5/1996 | Chester | |
| 5,598,338 A | 1/1997 | Taniguchi et al. | |
| 5,784,021 A | 7/1998 | Oliva | |
| 5,815,092 A | 9/1998 | Gregg, III et al. | |
| 5,852,417 A | 12/1998 | Valentine et al. | |
| 5,859,628 A | 1/1999 | Ross et al. | |
| 5,912,822 A | 6/1999 | Davis et al. | |
| 5,935,190 A | 8/1999 | Davis et al. | |
| 5,977,884 A | 11/1999 | Ross | |
| 6,118,403 A | 9/2000 | Lang | |
| 6,201,493 B1 | 3/2001 | Silverman | |
| 6,204,798 B1 | 3/2001 | Fleming, III | |
| 6,384,776 B1 | 5/2002 | Martin | |
| 6,400,304 B1 | 6/2002 | Chubbs, III | |
| 6,400,305 B1 * | 6/2002 | Kuhn | G01S 7/022 342/193 |
| 6,469,653 B1 | 10/2002 | Haynes | |
| 6,483,452 B1 * | 11/2002 | Iwakini | G01S 7/022 342/20 |
| 6,670,905 B1 | 12/2003 | Orr | |
| 6,943,723 B2 | 9/2005 | Kim et al. | |
| RE39,038 E | 3/2006 | Fleming, III | |
| 7,301,494 B2 | 11/2007 | Waters | |
| 7,471,236 B1 | 12/2008 | Pitt et al. | |
| RE40,653 E | 3/2009 | Fleming, III | |
| 7,522,747 B2 | 4/2009 | Horibe | |
| 7,576,679 B1 | 8/2009 | Orr et al. | |
| 7,702,044 B2 | 4/2010 | Nallapureddy et al. | |
| 7,764,219 B2 | 7/2010 | Pitt et al. | |
| 7,804,440 B1 | 9/2010 | Orr | |
| RE41,905 E | 11/2010 | Fleming, III | |
| 7,899,450 B2 | 3/2011 | Pitt et al. | |
| 7,965,222 B2 | 6/2011 | Pitt et al. | |
| 7,999,721 B2 | 8/2011 | Orr | |
| 8,373,588 B2 | 2/2013 | Kuhn | |
| 8,421,667 B2 | 4/2013 | Batten et al. | |
| 8,515,414 B2 | 8/2013 | Pitt et al. | |
| 8,525,723 B2 | 9/2013 | Orr et al. | |
| 8,842,004 B2 | 9/2014 | Kabler et al. | |
| 8,970,422 B2 | 3/2015 | Washlow et al. | |
| 9,132,773 B2 | 9/2015 | Washlow et al. | |
| 9,135,818 B2 | 9/2015 | Washlow et al. | |
| 2003/0214430 A1 | 11/2003 | Husted et al. | |
| 2003/0218562 A1 | 11/2003 | Orr | |
| 2004/0056778 A1 | 3/2004 | Hilliard | |
| 2005/0242984 A1 | 11/2005 | Waters | |
| 2006/0132349 A1 | 6/2006 | Stern et al. | |
| 2009/0092284 A1 | 4/2009 | Breed et al. | |
| 2009/0160696 A1 | 6/2009 | Pare et al. | |
| 2009/0256736 A1 | 10/2009 | Orr | |
| 2010/0214148 A1 | 8/2010 | Kuhn | |
| 2010/0214149 A1 | 8/2010 | Kuhn | |
| 2010/0238064 A1 * | 9/2010 | Formanek | H04K 3/22 342/20 |
| 2010/0317420 A1 | 12/2010 | Hoffberg | |
| 2011/0149933 A1 | 6/2011 | Pitt et al. | |
| 2012/0268306 A1 | 10/2012 | Coburn et al. | |
| 2012/0326889 A1 | 12/2012 | Kabler et al. | |
| 2013/0009760 A1 | 1/2013 | Washlow et al. | |
| 2013/0207829 A1 | 8/2013 | Kabler et al. | |
| 2013/0211707 A1 | 8/2013 | Washlow et al. | |
| 2013/0214939 A1 | 8/2013 | Washlow et al. | |
| 2014/0266853 A1 * | 9/2014 | Orr | G01S 7/023 342/20 |
| 2015/0123834 A1 | 5/2015 | Kabler et al. | |
| 2016/0363650 A1 * | 12/2016 | Batten | G01S 7/022 |
| 2018/0074164 A1 * | 3/2018 | De Wilde | G01S 7/022 |

FOREIGN PATENT DOCUMENTS

| | | |
|---|---|---|
| JP | 2006-171001 A | 6/2006 |
| WO | 2010096760 A1 | 8/2010 |
| WO | 2011071826 A1 | 6/2011 |
| WO | 2011087714 A1 | 7/2011 |
| WO | 2014151793 A2 | 9/2014 |

OTHER PUBLICATIONS

Analog Devices, Inc., "Blackfin+ Core Embedded Processor", ADSP-BF700/701/702/703/704/705/706/707 data sheet, Mar. 2018, https://www.analog.com/media/en/technical-documentation/data-sheets/adsp-bf700_bf701_bf702_bf703_bf704_bf705_bf706_bf707.pdf.

* cited by examiner

SLIDING WINDOW DISCRETE FOURIER TRANSFORM (SWDFT) POLICE SIGNAL WARNING RECEIVER

BACKGROUND a. Field

The present disclosure relates to receivers that detect police radar signals.

BRIEF SUMMARY

Warning receivers and methods of detecting one or more signals (e.g., RADAR signals) generated in the context of law enforcement activity using sliding window discrete Fourier transform (SWDFT) techniques are provided. Using a SWDFT allows calculating frequency spectra at a faster rate and more efficiently than a conventional fast Fourier transform for real-time signal analysis. A SWDFT simplifies the calculations for continuous signal analysis by using prior results in subsequent calculations as a window moves incrementally along the signal. The derived SWDFT may be expressed as:

$$X^{k+1}(m) = e^{j2\pi m/N}[X^k(m) + X(k+N) - X(k)]$$

Where $X^k(m)$ is the N-point fast Fourier transform over the sequence segment beginning at the time k and $X^{k+1}(m)$ is the N-point fast Fourier transform over the sequence segment beginning at the time k+1. See T. Springer. "Sliding FFT computes frequency spectra in real time", *EDN Magazine*, Sep. 29, 1988, pp. 161-170, which is incorporated herein by reference.

In one embodiment, for example, a police activity detector is provided. The detector includes a receiver section and a warning section. The receiver section is configured to receive signals generated in the context of law enforcement activity, including pulsed signals. The warning section is configured to respond to a signal received by the receiver section and provide an alert if a received signal correlates to a law enforcement signal. The warning section also includes a sliding window discrete Fourier transform (SWDFT) module configured to receive a plurality of time series of data corresponding to sampling a received signal at different sample rates corresponding to a plurality of target frequencies, perform a SWDFT determination on each of the plurality of time series of data to determine a magnitude of the received signal at each of the targeted frequencies, and issue an alert if the magnitude of the received signal at least one of the targeted frequencies is greater than or equal to a predetermined threshold. The SWDFT module is configured to identify the presence of any received pulse signals at a targeted pulse frequency from the received signal. The SWDFT module performs a SWDFT determination on each of the plurality of time series of data corresponding to sampling at a set of selected sample rates based upon the targeted pulse frequency. The SWDFT determination will reveal the presence of any of these pulse signals as an elevated SWDFT magnitude at each of a set of targeted pulse frequencies.

In another example embodiment, a method of detecting a RADAR signal is provided. The method includes receiving signals generated in the context of a law enforcement activity at a receiver section of a detector, determining a plurality of time series of data corresponding to sampling a received signal at different sample rates corresponding to a plurality of target frequencies at a warning section of the detector, wherein the warning section comprises a sliding window discrete Fourier transform (SWDFT) module, performing a SWDFT determination on each of the plurality of time series of data to determine a magnitude of the received signal at each of the targeted frequencies, and issuing an alert if the magnitude of the received signal at least one of the targeted frequencies is greater than or equal to a predetermined threshold.

The foregoing and other aspects, features, details, utilities, and advantages of the present invention will be apparent from reading the following description and claims, and from reviewing the accompanying drawings.

A BRIEF DESCRIPTION OF THE DRAWINGS

Embodiments will now be described, by way of example only, with references to the accompanying drawings in which.

DETAILED DESCRIPTION

Figure 1:
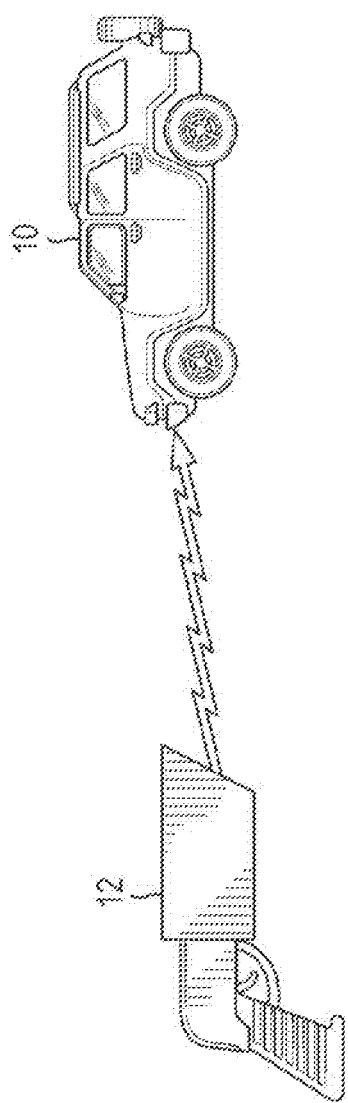
FIG. 1 is an embodiment of a vehicle and RADAR gun.

Referring now to FIG. 1, a vehicle 10 is illustrated in operation on a roadway, under exposure to radio frequency signals from a variety of sources, including police sources, such as RADAR gun 12, as well as other non-police sources of interference from surrounding businesses, homes, etc. (not shown). Vehicle 10 is equipped with a RADAR detector capable of detecting both the police and non-police sources. In some embodiments, the RADAR detector may also be able to identify the present coordinate and/or velocity of the vehicle, e.g. using an associated GPS receiver or alternatively a receiver of land-based signals such as LORAN, as disclosed in U.S. Pat. No. 6,670,905 of the present assignee, which is hereby incorporated by reference in its entirety. In these embodiments, the RADAR detector is able to use this information to enhance its decision-making abilities.

In some embodiments, for example, a police RADAR source may include one or more pulsed RADAR sources, such as but not limited to Multi-RADAR CT (MTRCT), RT3 Multiple Vehicle Tracking RADAR, FMCW Modulated RADAR. Similarly, RADAR detectors described herein may also be able to identify and suppress warnings for non-police RADAR pulsed signals, such as but not limited to Automotive RADAR Sensors (ARS) such as used in adaptive cruise control, collision warning systems, emergency brake assist, collision mitigation systems, vulnerable road user detection, blind spot detection, lane change assist, rear cross-traffic alert, back-up parking assist and the like.

The RADAR detector uses sliding window discrete Fourier transform techniques in the detection of one or more signals of interest.

DSP-Based Detector

Figure 2:
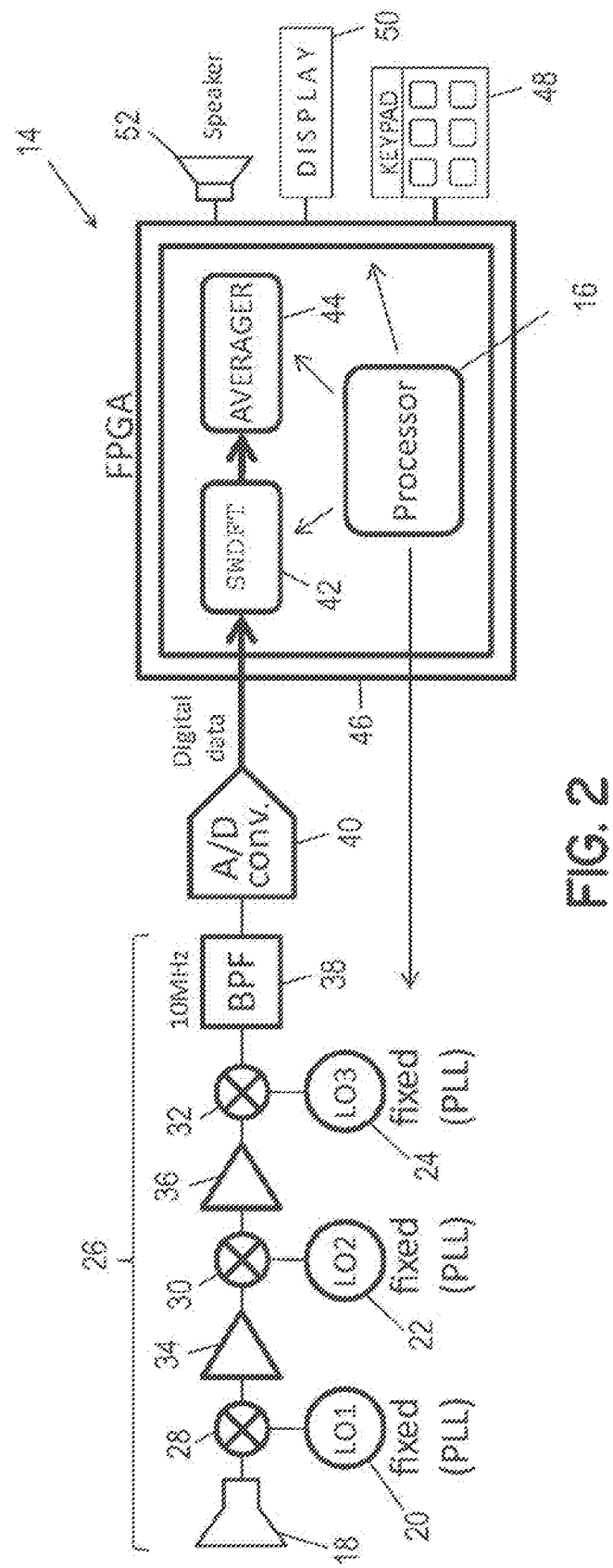
FIG. 2 is an embodiment of a digital signal processing (DSP) based implementation of a RADAR detector.

One example embodiment of a digital signal processing (DSP) based implementation of a RADAR detector 14 is illustrated in FIG. 2. In this particular embodiment, the DSP-based RADAR detector 14 includes a processor 16 for controlling all functions of the detector 14, although in other embodiments, one or more additional processor(s) may control various functions of the detector 14. Processor 16 receives information on RADAR signals from a microwave receiver 26. In some embodiments, and as seen in FIG. 2, three Local Oscillators (LO), 20, 22, 24 are part of a super heterodyne receiver structure 26. Signals from each local oscillator 20, 22, 24 drive a mixer 28, 30, 32 which downconverts an incoming signal to an intermediate frequency for ease of processing. At each stage, the mixer 28, 30, 32 creates a copy of the incoming signal at the frequency set by the difference between the original and the LO 20, 22, 24 frequencies. Signals from the first two stages are amplified by amplifiers 34, 36 before being transmitted to the next stage. In contemporary detectors, the first local oscillator 20 is typically controlled using analog methods by applying a ramp control voltage, in order to implement a frequency sweep.

In the embodiment shown in FIG. 2, a triple-conversion super heterodyne receiver 26 is used to assist in providing greater ability to implement gain and selectivity as well as to avoid spurious products by properly selecting frequencies for the oscillators, although, one of ordinary skill in the art will recognize that other numbers of oscillators, mixers, and amplifiers may also be used. The frequency shifted input from the super heterodyne receiver 26 is then sent through a band pass filter 38, the bandwidth of which may be chosen based on a number of steps through the frequency range of interest. The frequencies of the first and second LOs 20, 22 are changed in steps by processor 16. At each step, the portion of bandwidth, also referred to herein as a channel, is digitized by the analog-to-digital converter (ADC) 40 and processed by the sliding window DFT 42 (SWDFT 42) and Averager 44 modules under direction of the processor 16. By using the SWDFT 42, all signal processing, detection and recognition implemented in detector 14 may be performed digitally and in the frequency domain. After processing, the processor 16 changes the first and second LOs 20, 22 to the frequency corresponding to the next channel and the process repeats.

In one embodiment, individual channels may include one or more predetermined target frequency or frequency range associated with a target RADAR signal, such as but not limited to a pulsed RADAR gun as described above. For example, various channels filtered may be centered on or otherwise include one or more target frequency such as the target frequencies 2989 Hz, 9083 Hz, 13.3 KHz and 25.8 Khz shown and described with reference to the particular example embodiment of FIG. 3. In this embodiment, channels including one or more individual target frequencies may be provided to the SWDFT 42 for analysis.

In some embodiments, the Digital Signal Processing algorithms for the SWDFT 42, Averager 44, and processor 16 may be implemented on an FPGA 46 or ASIC. In other embodiments, these components may be integral in the processor or implemented as separate hardware components. By using an FPGA 46, as opposed to a conventional DSP processor, improved digital processing throughput may be realized at a lower cost. Additionally, an FPGA 46 allows for implementation of several digital functions executing in parallel, such as, for example the Averager 44. The ability to parallel process may assist in realizing reduced times when running multiple concurrent averaging engines, which process the same signals during averaging. In some embodiments, processor 16 may further be programmed to manage and report detected signals in various ways depending on its stored program. Embodiments of the RADAR detector 14 may also incorporate a user input keypad 48 or switches. Processor 16 may be further connected to a display 50, which may include one or more light emitting diodes for indicating various status conditions, or in a more feature-rich device, may include an alphanumeric or graphical display for providing detailed information to a user. A speaker 52 may also be provided to enable processor 16 to deliver audible feedback to a user under various alert conditions. Recent innovations in DSP device technology such as the Analog Devices Blackfin BF706 DSP are now a practical alternative to FPGA-based DSP solutions and can also implement the SWDFT efficiently on pulsed radar signals. This DSP device solution will eliminate the need for FPGA-based methods as DSP chip prices continue to decline.

Processor 16 may also include other interfaces (not shown), such as an ODB II compliant interface, for connection to vehicle electronic systems that are built into the vehicle 10. Most modern vehicles are being equipped with standardized information systems using the so-called ODB II standard interface. This standard interface is described in an article entitled "ODB II Diagnostics," by Larry Carley, from Import Car, January 1997, which is hereby incorporated herein by reference. Processor 16, using the ODB II standard interface, may be able to obtain vehicle speed and other vehicle status information directly from the vehicle.

The RADAR detector 14 can be configured to detect standard RADAR signals (e.g., CW signals) over X, K, Ka bands and/or one or more individual target frequencies of a pulsed RADAR target. For example, one example embodiment may be configured to solely detect one or more pulsed signals and another example embodiment may be configured to detect one or more individual pulsed signals as well as standard police RADAR signals (e.g., CW signals) in X, K, Ka bands. A typical bandwidth of interest is approximately 3 GHz. In some embodiments, for example, this overall bandwidth may be effectively divided into about 300 channels, each approximately 10 MHz wide. In these embodiments, a combination of changes in the first and second local oscillators 20, 22 may result in effective 10 MHz steps of the incoming RF frequency in the super heterodyne receiver 26. In other embodiments, the bandwidth may be divided into a different number of channels at different bandwidths.

Figure 3:
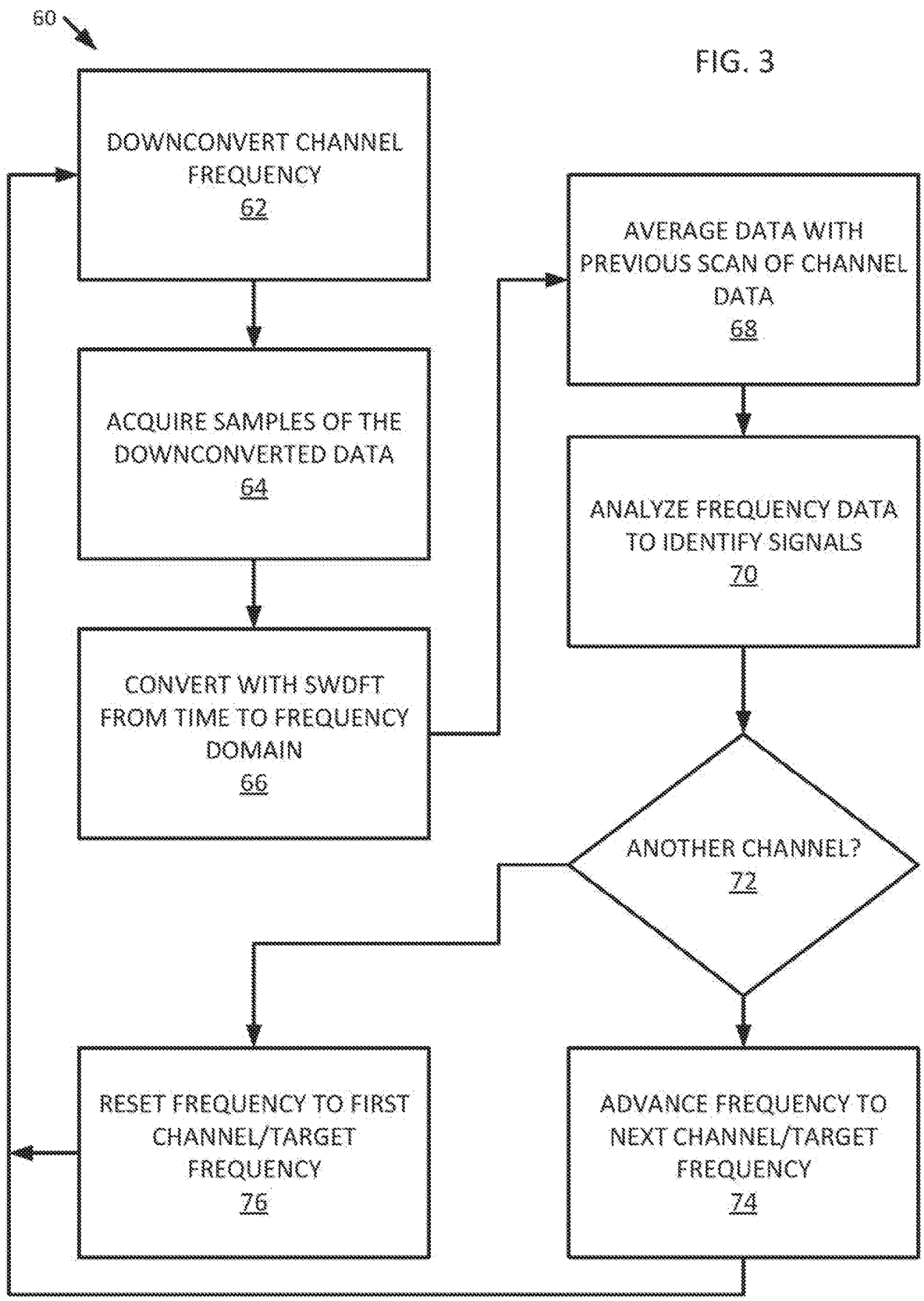
FIG. 3 is a flowchart depicting an embodiment of a signal analysis process.

At each of the approximately 10 MHz steps, and as seen in the flowchart 60 in FIG. 3, the following processes may occur. First, the channel including one or more target frequencies is downconverted to an intermediate frequency for processing (block 62). The ADC 40 acquires samples of data (block 64) to create a digital snapshot of the data. In some embodiments, for example, the ADC 40 may acquire 256 or 1024 samples of data to create the digital snapshot of the data, though other numbers of samples may also be used. Next, an SWDFT processor 42 running under control of processor 16 converts the sampled data from the time domain to the frequency domain (block 66). Then, the new frequency data may be averaged together with several previous scans/snap shots from the same channel (block 68) to assist in reducing peak-to-peak noise variations. This process effectively reduces noise floor and improves resultant sensitivity. However, the more averaging is applied to a portion of spectrum, the longer it takes to complete the analysis. Therefore, in order to detect weak signals of longer duration, it is appropriate to apply a greater amount of averaging; however, for stronger signals of short duration, less averaging should be applied, in order to maintain fast response. To assist in faster response times, as set forth above, the averaging may be accomplished using multiple averaging engines concurrently performing analysis of the frequency data. Usage of parallel digital pipelines of the FPGA 46 may assist in implementing the concurrent processing to achieve both speed and sensitivity, such as through implementation of several averaging engines running in parallel. As a result, short duration but stronger signals (e.g., pulsed RADAR or POP RADAR signals) may be detected at the output of the X1 or X8 averaging engines, and at the same time, weak signals may also be detected at the output of the X64 averaging engine. (X1, X8 and X64 averaging amounts are just one possible scheme of distribution of averaging for a particular embodiment. Other embodiments may employ other distributions of averages). Finally, an amplitude of each target frequency component in the spectrum (or each frequency component in the spectrum) is analyzed and any signals present in the spectrum are identified (block 70). Fully digital processing, executing in the frequency domain may assist in producing spectrum snap-shots of large ranges of bandwidth, including the target frequencies in the spectrum of interest. This may then provide an opportunity for a digital processor to use pattern-recognition techniques to analyze and detect specific types of radar sources in some embodiments. For example, park-assist systems or automatic cruise control radar systems employed in certain cars may generate false-alarms, unless the source of the signal is properly recognized, based on specific frequency components in the signal, and their specific relation to one another, as determined by high speed DSP spectral analysis of the received signal.

At the completion of the analysis, the next channel, including one or more target frequencies is analyzed. If there is another channel to analyze ("Yes" branch of decision block 72), then the processor adjusts the frequencies of the first and second LOs 20, 22 (block 74) and the process continues at block 62. If there are no further channels ("No" branch of decision block 72), then the frequencies of the first and second LOs 20, 22 are reset to the base frequency of the region of interest (block 76), and the process continues at block 62.

Analog-Based Detector

Figure 4:
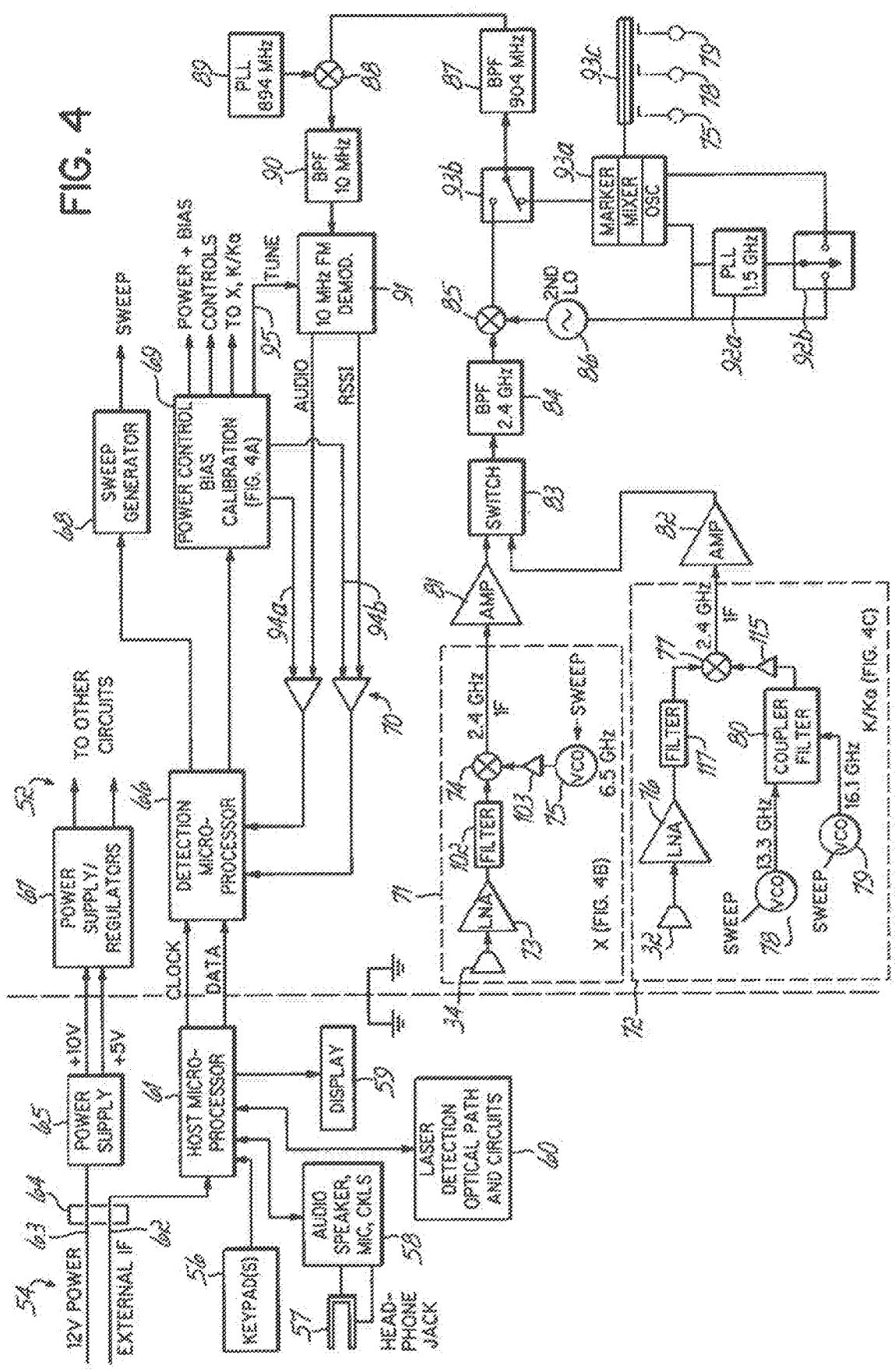
FIG. 4 is an embodiment of an analog-based implementation of a RADAR detector.

Another example embodiment of a RADAR detector includes an analog-based implementation of a RADAR detector as shown in FIG. 4. As seen generally in FIG. 4, the example implementation of an analog-based RADAR detector includes an RF section 52 and a control section 54. Control section 54, for example, may be enclosed in an external housing, surrounding a shielded case. Example arrangements, for example, are shown and described in more detail in U.S. Pat. No. 7,388,537, which is hereby incorporated herein in its entirety. The external housing may be made of plastic or other nonconductive or semi-conductive materials so the components of control section 54 do not emit significant radiation. The external housing has a keypad 56 comprising a number of buttons or keys that a user may use to control the radar detector, including controlling its functions, sensitivity settings, on-off state, and other typical functionality. The external housing may further have a headphone jack 57 connected to an audio circuit 58. Audio circuit 58 includes a speaker and an audio circuit for driving headphone jack 57 in case the driver desires to connect the radar detector to a car audio system for audible alerts. The audio system 58 may also contain a microphone for detecting ambient noise levels within the vehicle and/or for receiving voice commands for controlling the radar detector. The external housing further contains a display 59 for providing status displays and information to users of the radar detector. Further details of various displays that may be created by a radar detector are disclosed in U.S. Pat. No. 5,668,554, the entirety of which is hereby incorporated herein.

The external housing of the radar detector further encloses an optical system 60 for laser detection. Laser detection is explained in greater detail in U.S. Pat. No. 5,206,500, which is hereby incorporated herein in its entirety.

Keypad 56, audio circuit 58, display 59 and laser circuitry 60 are controlled by host microprocessor 61, which has overall control over the operation of the radar detector. Microprocessor 61 is further connectable through an external interface jack 62 to send or receive control signals from external devices. For example, host microprocessor 61 may control external sensors or external server signal emitters that are part of a radar detection system.

Operating power for the radar detector is provided by a 12-volt power connector 63, which may be on a common jack 64 with the external interface 62. A power supply circuit 65 supplies power to electrical circuits in the control side of the radar detector and provides five and ten volt power supply lines to the RF section 52 through a five-pin connector coupling control section 54 to RF section 52. Host microprocessor 61 is coupled through a clock and data connection to a detection microprocessor 66 within RF section 52. Detection microprocessor 66 is powered by power supply regulator 65, which receives power from the external power supply. Power supply regulators 65 and 67 supply power to circuits in RF section 52.

The detection microprocessor 66 is responsible for controlling each of the components of the RF section of the detector. These include a sweep generator 68 which generates a sweep control signal, which is delivered to voltage controlled oscillators to perform a frequency sweep to search radar bands for police radar signals. Microprocessor 66 also controls a variety of power control and bias calibration circuits 69, which are responsible for providing power and controlling calibration of the analog receiver circuits of the radar detector. Further details on the power control and bias calibration circuitry 69 are provided in U.S. Pat. No. 7,388,537, which is incorporated by reference in its entirety.

Detection microprocessor 66 is responsive to digitized signals from an analog detector 70, which essentially comprises dual comparators, which operate at thresholds that are controlled by the microprocessor 66. Microprocessor 66 performs digital signal processing upon that digitized signal to determine the presence of police radar signals. Schemes for detecting police radar signals are disclosed in detail in the art, such as in U.S. Pat. No. 6,836,238 and other U.S. patents that are incorporated by reference into U.S. Pat. No. 6,836,238, all of which are hereby incorporated by reference herein.

In one particular embodiment, for example, the detector includes a separate X-band detection section 71 and K/Ka band detection section 72. Further details on section 71 are provided in FIG. 4B below and further details on section 72 are provided in FIG. 4C below. In broad overview, X-detection section 71 includes horn antenna 34, and a low-noise amplifier 73 connected thereto, which amplifies X-band microwave signals and delivers them via stripline filters 102 to an X-band mixer 74. Mixer 74 receives a 6.5 GHz local oscillator signal from a local oscillator 75 via a buffer amplifier 103 that includes filtering circuitry. This local oscillator signal is swept through a frequency range in response to the sweep signal of sweep generator 68. Mixer 74 produces an output signal as a consequence of mixing incoming X-band radar with the local oscillator signal. This output signal is an intermediate frequency at approximately 2.4 GHz. It will be appreciated that the X band local oscillator signal is filtered aggressively to remove second harmonics thereof, because mixer 74 provides dominant mixing of the local oscillator signal and incoming radar signals at twice the local oscillator frequency. Assuming the mixer is driven from a pure sinusoidal local oscillator signals, and the mixer diodes are matched, only the odd harmonics of the oscillator frequency will appear across the diode, and since the dominant mixing mode is at twice the local oscillator frequency, signals at the mixer as a result of the local oscillator drive can be removed because they differ from the frequency of the dominant mixing action by an amount equal to the local oscillator frequency or multiples thereof, producing an intermediate frequency signal at the difference frequency between 10.525 GHz and 13.0 GHz.

K/Ka band section 72 is similar in architecture to X-band section 71. Here, K or Ka band microwave signals are received by an antenna 32 and amplified by a low-noise amplifier 76 and delivered via strip line filters 117 to a mixer 77. Mixer 77 also receives either a K band or Ka band local oscillator frequency, from one of local oscillator 78 or local oscillator 79. The outputs of local oscillators 78 and 79 are coupled through a coupler and filter 80, and a buffer amplifier 115, to mixer 77. As discussed above, mixer 77 has a predominant mixing action at twice the local oscillator frequency, and therefore K band radiation at 24.15 GHz mixed with the local oscillator 78 at 13.3 GHz, and Ka band radiation at 34.7 GHz mixed with local oscillator 79 at 16.1 GHz, produce an intermediate frequency signal at 2.4 GHz at the output of mixer 77.

Power control and bias calibration circuits 69, control power to low-noise amplifier 73 and 76, mixer 74 and 77 and local oscillator 75, 78 and 79. With these power connections, the radar detector is controlled so that only one band of radiation is sampled at any given time. That is, an X-band sweep is done by activating low-noise amplifier 73, mixer 74 and local oscillator 75, while all elements in the K/Ka band section 72 are in the dormant state. K-band radiation is sampled by leaving all elements in the X-band section 71 in a dormant state and applying power to only low-noise amplifier 76, mixer 77, local oscillator 78 and buffer amplifier 82. Ka-band radiation is detected by returning local oscillator 78 to a dormant state and applying power to local oscillator 79.

The 2.4 GHz intermediate frequency outputs from X-band section 71 and K/Ka band section 72 are delivered through low noise amplifiers 81 and 82, respectively, and through a switch 83 to a 2.4 GHz band pass filter 84. This band pass filtering removes undesired mixer products of the incoming signals, leaving only a 2.4 GHz band of potential police radar signals. The output of band pass filter 84 is delivered to a mixer 85 which receives a 1.5 GHz signal from the second local oscillator 86. Under normal operating conditions, local oscillator 86 is controlled by a phase locked loop circuit 92a, connected to local oscillator 86 via switch 92b, to maintain a frequency of 1.5 GHz. In this normal operating condition, the output signal from mixer 85, which includes the police radar signals at a difference frequency of approximately 900 MHz, is delivered via switch 93b to a band pass filter 87 which removes all other aliases created by mixer 85. The output band pass filter 87 is then delivered to a mixer 88 which also receives a phase locked 894 MHz signal from phase locked loop circuit 89. The resulting 10 MHz band of police radar signal is delivered to band pass filter 90, which removes all other components other than the 10 MHz window potentially containing police radar signals. This 10 MHz signal is then delivered to an FM demodulator circuit 91 of the type commercially available and typically used in radar detectors. The resulting audio band signal is delivered to a comparator of the analog detector 70, where it is digitized and delivered to detection microprocessor 66. The received signal strength indicator (RSSI) output of the demodulator 91 is also fed to a comparator of detector 70, and the digitized result is delivered to microprocessor 66. Microprocessor 66 controls the thresholds applied to the comparators of analog detector 70, to establish a minimum received signal strength and minimum audio signal.

As described in more detail below with reference to FIG. 5, the RSSI output may also be provided to a SWDFT module for use in detecting whether a target frequency signal is detected.

The circuitry of FIG. 4 further includes connections for calibration of frequency sweep applied to the local oscillators 75, 78 and 79. During calibration, switches 92b and 93b are controlled so that switch 93b connects the output of a marker circuit 93a (rather than the output of mixer 85) to band pass filter 87, and switch 92b connects PLL 92a to marker circuit 93a (rather than to local oscillator 86). A microstrip 93c is coupled to the outputs of oscillators 75, 78 and 79 to capture the frequency of those oscillators (only one oscillator is active at any given time), and deliver that frequency into marker circuit 93a. Marker circuit 93a comprises a mixer and oscillator. When calibration is being performed, the oscillator of marker circuit 93a is controlled by PLL circuit 92a via switch 92b, so that marker circuit 93a mixes the controlled frequency from its oscillator with the frequency from local oscillator 75, 78 or 79, and delivers the resulting intermediate frequency via switch 93b to band pass filter 87. Through further demodulation as discussed above, microprocessor may detect can calibration the sweep applied to local oscillators 75, 78 and 79.

SWDFT

Figure 5:
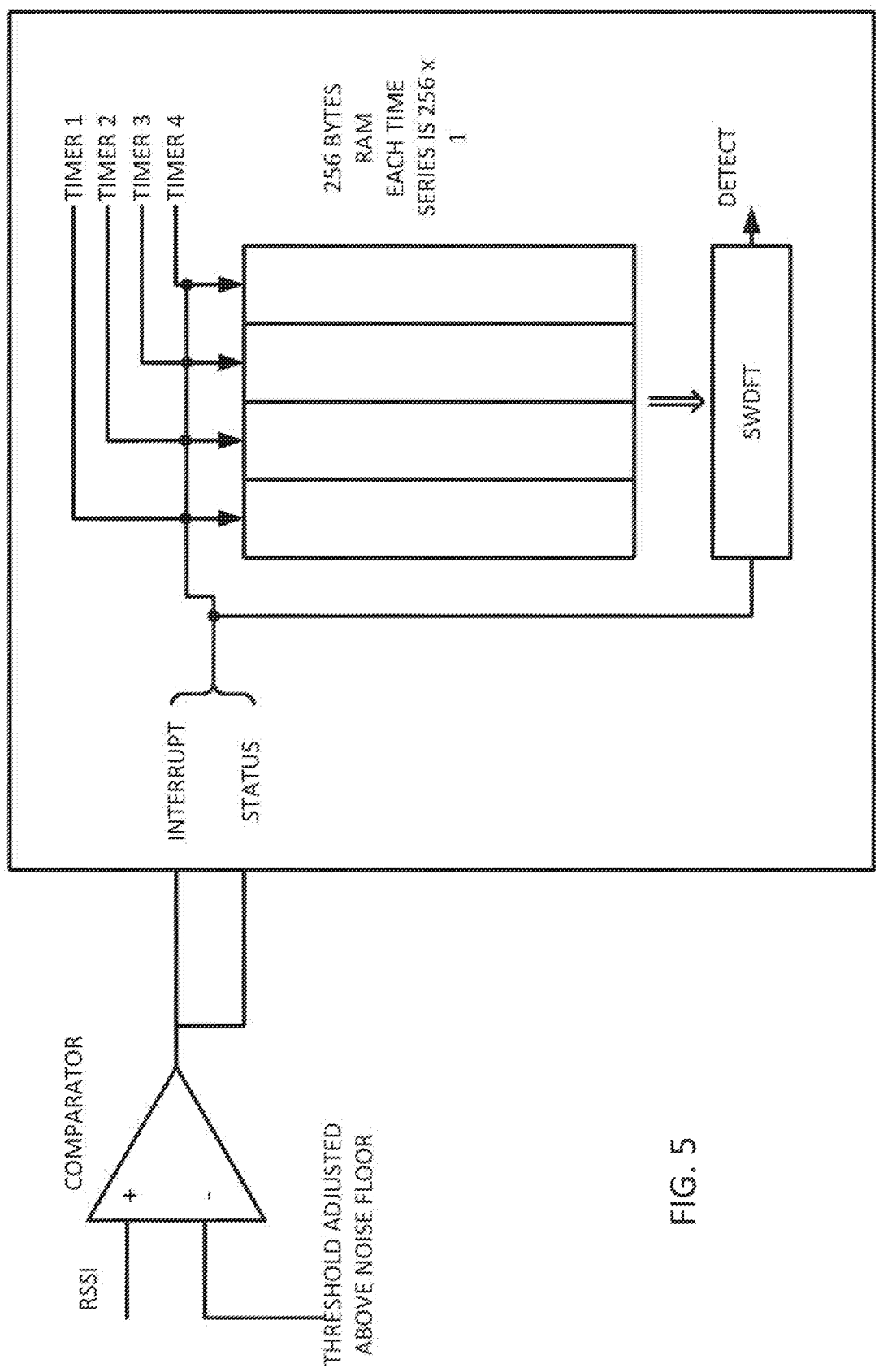
FIG. 5 is an embodiment of a SWDFT that may be used in a RADAR detector.

FIG. 5 depicts an example embodiment of a SWDFT 42 that may be used in a RADAR detector, such as but not limited to those shown in FIGS. 2 and 4. In this particular embodiment, for example, the SWDFT implementation includes an input from an RSSI of the detector circuit shown in FIG. 4, but may be modified, such as but not limited to as described below for incorporation into a DSP implementation, such as shown in FIG. 2. In this particular embodiment, the SWDFT 42 receives the input data in four channels corresponding to four distinct target frequencies to be detected, though any number of target frequencies may be detected. In this embodiment, four timers provide sampling rates corresponding to each of the four target frequencies and provide time series of data for each of the target frequencies. In this embodiment, each time series of data is provided to a memory, such as the RAM memory shown in FIG. 2B. The RAM, for example, may operate as a FIFO RAM. The RAM, for example, may include a RAM of the processor 16 or a separate RAM accessible by the processor 16. A 256 byte RAM, for example, may be used to store up to eight individual 256 bit time series. In the particular embodiment shown in FIG. 2B, for example, four 256 bit time series of data are stored in a 256 byte RAM. The same 256 RAM could also be used to store four 512 bit time series of data or up to eight 256 bit series of data.

When a full time series of data (e.g., 256 bits) is stored in the RAM, the SWDFT module performs a SWDFT operation on the time series of data and determines whether a target frequency (e.g., a pulsed RADAR target frequency) is detected. In some embodiments, each time a time sample is taken, it is loaded into RAM and a SWDFT operation is performed to determine whether a target frequency is detected. The SWDFT module, for example, may determine an actual magnitude of a time series of data for a particular sampling rate by calculating a square root of the sum of the squares of the real and imaginary time series components or determine an estimate of the magnitude (e.g., taking an absolute value). The SWDFT module then compares the actual or estimated magnitude for each sampling rate to a predetermined threshold value to determine whether the signal identifies a likely police RADAR signal at the target frequency corresponding to the particular sampling rate.

In the event the target frequency is detected, an alert may be issued. In one embodiment, the SWDFT module repeats this process for each time series of data stored in the RAM corresponding to the predetermined target frequencies before moving onto a new time series. In some embodiments, the SWDFT operation is repeated for each time sample taken at various sample rates corresponding to the predetermined target frequencies. In this embodiment, the SWDFT 42 may reduce overhead compared to a process that analyzes the input data for different target frequencies sequentially.

In a DSP based implementation of a RADAR detector, such as but not limited to FIG. 2, the module of FIG. 5 may be used with a digital element (e.g., a PLD) of the detector (either already present in the detector shown in FIG. 2 or one or more additional elements) adapted to calculate energy or power present (e.g., total energy or power present) as the receiver is stepped through a spectrum of interest (e.g., a K-spectrum of 24050 to 24250 MHz). In one embodiment, for example, energy can be calculated directly from a time series by summing an absolute value of samples from an A/D, which from Parseval's theorem is equivalent to the energy in the spectrum of the signal. This value can be calculated in a sliding window and fed into a PLD and a SWDFT block that performs the same SWDFT previously described. The PLD can sweep the spectrum (e.g., K-spectrum) at a much lower rate than it might otherwise use for carrier wave (CW) signal detection, so a dwell time at any frequency can be long enough to see any of the pulse frequencies of interest. Also, an energy measurement may have more resolution than the 1 bit available in the particular example described previously so that the SWDFT, in this particular example, may carry more bits of precision as well, and a detection threshold may be set at a number of points, such as close to a noise floor.

In one particular embodiment for RADAR detectors (e.g., analog and/or DSP based), a bank of SWDFT's may be added or tuned to each of the RADAR gun's pulse rates of interest.

GPS

As described above, the RADAR detector may also be able to identify the present coordinate and/or velocity of the vehicle, e.g., analog, DSP-FPGA or DSP-Chip based microprocessor using an associated GPS receiver or alternatively a receiver of land-based signals such as LORAN, as disclosed in U.S. Pat. No. 6,670,905 of the present assignee (the '905 Patent), which is hereby incorporated by reference in its entirety. In these embodiments, the RADAR detector is able to use this information to enhance its decision-making abilities.

In some embodiments, GPS rejection methods can be used to improve the handling of Pulsed Radar signal cases. As described in the '905 Patent, a RADAR detector may be configured to learn one or more locations of stationary signals and their associated frequencies as these are likely to be spurious police RADAR sources (e.g., door openers and other non-police radar applications).

In the present embodiment, for example, a RADAR detector comprises a GPS application that may be used to reject spurious police RADAR signals and/or confirm suspected or confirmed police RADAR signals. Where a particular type of police RADAR signal is likely to be stationary (e.g., fixed location or located in a parked police vehicle) while a spurious RADAR signal is likely to be moving (e.g., collision avoidance system signal) a GPS determination may be used to confirm a signal as a likely police RADAR signal and issue an alert or to reject a signal as a spurious RADAR signal depending on the determination of the signal source. Similarly, where the inverse is true, the detector may be configured to reverse the determination.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A police activity detector comprising:
a receiver section configured to receive signals generated in a context of law enforcement activity; and
a warning section configured to respond to a pulsed signal received by the receiver section and provide an alert if a received pulsed signal correlates to a law enforcement signal,
wherein the warning section is configured to determine presence of the received pulsed signal corresponding to at least one of a plurality of target carrier frequencies, wherein the warning section receives a plurality of time series of data corresponding to sampling the received pulsed signal at different sample rates based on the plurality of target carrier frequencies and performs a sliding window discrete Fourier transform (SWDFT) determination on each of the plurality of time series of data to determine a magnitude of the received pulsed signal at each of the target carrier frequencies, and issues an alert if the magnitude of the received pulsed signal corresponding to at least one of the target carrier frequencies is greater than or equal to a predetermined threshold.

2. The police activity detector of claim 1, wherein the police activity detector comprises a GPS module configured to determine if a source of the pulsed signal is mobile or fixed.

3. The police activity detector of claim 2, wherein the warning section is configured to confirm the alert if the source is fixed.

4. The police activity detector of claim 2, wherein the warning section is configured to suppress the alert if the source is fixed.

5. The police activity detector of claim 2, wherein the warning section is configured to confirm the alert if the source is mobile.

6. The police activity detector of claim 2, wherein the warning section is configured to suppress the alert if the source is mobile.

7. The police activity detector of claim 1, wherein the warning section comprises a memory, including a plurality of bytes of storage and the time series of data corresponding to a single sample rate are stored across individual bits of a plurality of bytes of the memory.

8. The police activity detector of claim 7, wherein the memory comprises a random access memory of a processor of the police activity detector.

9. A method of detecting police activity comprising:
 receiving a pulsed signal generated in a context of a law enforcement activity at a receiver section of a detector;
 receiving a plurality of pulsed time series of data with pulse rates corresponding to a set of sample rates based on a plurality of target frequencies, at a warning section of the detector;
 performing a SWDFT determination on each of the plurality of time series of data to determine a magnitude of the received pulsed signal at each of the targeted frequencies, wherein presence of a pulsed signal corresponding to at least one of the targeted frequencies is indicated when the magnitude of the received pulsed signal is elevated; and
 issuing an alert if the magnitude of the received pulsed signal corresponding to at least one of the targeted frequencies is greater than or equal to a predetermined threshold.

10. The method of claim 9, wherein the detector comprises a GPS module configured to determine if a source of the pulsed signal is mobile or fixed.

11. The method of claim 10, wherein the warning section is configured to confirm the alert if the source is fixed.

12. The method of claim 10, wherein the warning section is configured to suppress the alert if the source is fixed.

13. The method of claim 10, wherein the warning section is configured to confirm the alert if the source is mobile.

14. The method of claim 10, wherein the warning section is configured to suppress the alert if the source is mobile.

15. The method of claim 9, wherein the warning section comprises a memory, including a plurality of bytes of storage and the time series of data corresponding to a single sample rate are stored across individual bits of a plurality of bytes of the memory.

16. The method of claim 15, wherein the memory comprises a random access memory of a processor of the detector.

* * * * *